United States Patent
Hoshino

(10) Patent No.: US 11,416,678 B2
(45) Date of Patent: Aug. 16, 2022

(54) QUESTION GROUP EXTRACTION METHOD, QUESTION GROUP EXTRACTION DEVICE, AND RECORDING MEDIUM

(71) Applicant: NEC CORPORATION, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 74 days.

(21) Appl. No.: 16/967,321

(22) PCT Filed: Feb. 5, 2018

(86) PCT No.: PCT/JP2018/003843
§ 371 (c)(1),
(2) Date: Aug. 4, 2020

(87) PCT Pub. No.: WO2019/150583
PCT Pub. Date: Aug. 8, 2019

(65) Prior Publication Data
US 2021/0034815 A1  Feb. 4, 2021

(51) Int. Cl.
*G06F 17/00* (2019.01)
*G06F 40/226* (2020.01)
(Continued)

(52) U.S. Cl.
CPC .......... *G06F 40/226* (2020.01); *G06F 40/216* (2020.01); *G06F 40/289* (2020.01); *G06F 40/35* (2020.01)

(58) Field of Classification Search
CPC ......... G06F 16/334; G06F 40/35; G06F 17/00
See application file for complete search history.

(56) References Cited

U.S. PATENT DOCUMENTS 10,460,398 B1 * 10/2019 Gielow ............... G06Q 30/016
2010/0106671 A1 * 4/2010 Li ........................... G06N 5/04
706/46
(Continued)

FOREIGN PATENT DOCUMENTS

CN  110019644 A  *  7/2019
JP  2004-266551 A     9/2004
(Continued)

OTHER PUBLICATIONS

Yun-Nung Chen et al., "Unsupervised Induction and Filling of Semantic Slots for Spoken Dialogue Systems Using Frame-Semantic Parsing," In Automatic Speech Recognition and Understanding (ASRU), 2013 IEEE Workshop on, pp. 120-125.
(Continued)

*Primary Examiner* — Shreyans A Patel
(74) *Attorney, Agent, or Firm* — Sughrue Mion, PLLC

(57) ABSTRACT

An addition unit 11, with regard to data indicating a conversation history including one or more sets of sentences formed from a problem sentence being a sentence indicating one problem, a question sentence being a sentence indicating a question for the one problem, and an answer sentence being a sentence indicating an answer to the question, adds a label indicating a problem state to the problem sentence within the data, a label indicating a question state to the question sentence within the data, and a label indicating an answer state to the answer sentence within the data. An extraction unit 12 extracts, from the data, a set of sentences with which the states indicated by the labels have been associated according to a state transition model that is a model configured from the one problem state, question state, and answer state, and that represents a transition of the states.

20 Claims, 12 Drawing Sheets

(51) Int. Cl.
　　*G06F 40/35*　　　(2020.01)
　　*G06F 40/289*　　(2020.01)
　　*G06F 40/216*　　(2020.01)

(56) References Cited

U.S. PATENT DOCUMENTS

2015/0261849 A1* 9/2015 Chu-Carroll .......... G06F 16/334
　　　　　　　　　　　　　　　　　　　　　707/723
2016/0239740 A1* 8/2016 Baughman ............... G06N 5/04
2017/0286396 A1* 10/2017 Sandor ................ G06F 16/2455

FOREIGN PATENT DOCUMENTS

| JP | 2004-354787 A | 12/2004 |
|---|---|---|
| JP | 2006-349954 A | 12/2006 |
| JP | 2007-102104 A | 4/2007 |
| JP | 2018-017936 A | 2/2018 |
| WO | 02/29633 A1 | 4/2002 |

OTHER PUBLICATIONS

Yun-Nung Chen et al., "Jointly Modeling Inter-Slot Relations by Random Walk on Knowledge Graphs for Unsupervised Spoken Language Understanding," in Proceedings of NAACL-HLT, May 31-Jun. 5, 2015, pp. 619-629.

Yuma Hayashi et al., "System of automatically generating a discussion map from proceedings by structuring a relationship between speeches", DEIM 2016.

Andreas Stolcke et al., "Dialogue Act Modeling For Automatic Tagging And Recognition of Conversational Speech", Computational Linguistics, Sep. 2000, vol. 26, issue 3, pp. 339-373, <DOI:10.1162/089120100561737> URL:https://dl.acm.org/citation.cfm?id=971872, particularly pp. 346-349.

International Search Report for PCT/JP2018/003843, dated Apr. 24, 2018.

\* cited by examiner

FIG. 2
STATE TRANSITION MODEL:
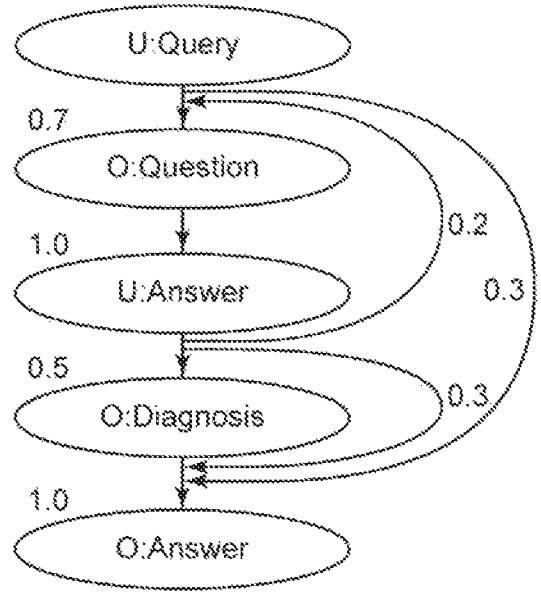
LABEL ADDITION PATTERN:
| STATE LABEL | PATTERN |
|---|---|
| U:Query | REGULAR EXPRESSION PATTERN |
| ... | ... |
CONVERSATION HISTORY DATA:
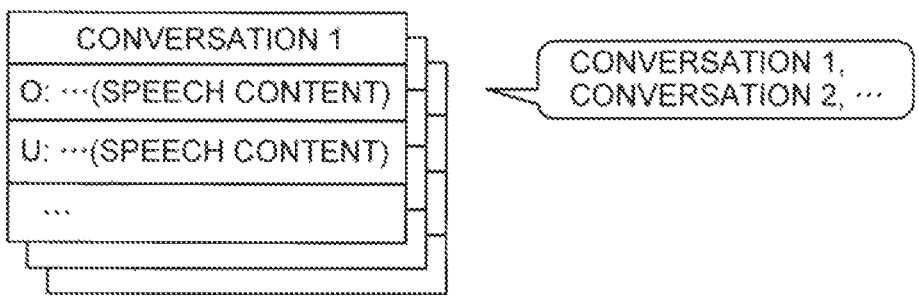

FIG. 3

| | CONVERSATION 1 | STATE LABEL |
|---|---|---|
| 1 | O: THIS IS OX SHOPPING MALL. | |
| 2 | U: IS THERE STOCK OF PRODUCT A? | U: Query |
| 3 | O: OK, LET ME CHECK. | |
| 4 | O: THERE IS STOCK OF PRODUCT A. | O: Answer |
| 5 | U: I'D LIKE TO BUY ONE. | U: Query |
| 6 | O: MAY I HAVE YOUR NAME, ADDRESS, AND PHONE NUMBER? | O: Question |
| 7 | O: FIRST, YOUR NAME, PLEASE. | |
| 8 | U: THIS IS ICHIRO NICHIDEN. | U: Answer |
| 9 | O: ADDRESS, PLEASE. | O: Question |
| 10 | U: 1-2-3 OO TOWN OO CITY, OO PREFECTURE. | U: Answer |
| 11 | O: WHAT IS YOUR PHONE NUMBER? | |
| 12 | U: 12-3456-7890. | U: Answer |
| 13 | O: YOUR ORDER FOR ONE PRODUCT A IS PLACED. | O: Answer |
| 14 | O: IS THERE ANY OTHER QUESTION? | |
| 15 | U: ACTUALLY, I DON'T KNOW HOW TO RETURN PRODUCT I PURCHASED BEFORE. | U: Query |
| 16 | O: WHAT IS PRODUCT YOU PURCHASED? | O: Question |
| 17 | U: IT IS PRODUCT B. | U: Answer |
| 18 | O: WHEN DID YOU PURCHASE? | O: Question |
| 19 | U: THREE DAYS AGO. | U: Answer |
| 20 | O: IT IS STILL IN COOLING-OFF PERIOD, AND PRODUCT CAN BE RETURNED. | O: Answer |
| 21 | O: PLEASE FOLLOW INSTRUCTION ON WEBSITE AND COMPLETE PROCEDURE. | |

FIG. 4

| | CONVERSATION 1 | STATE LABEL |
|---|---|---|
| 1 | O: THIS IS OX SHOPPING MALL. | |
| 2 | U: IS THERE STOCK OF PRODUCT A? | U: Query 1 |
| 3 | O: OK, LET ME CHECK. | |
| 4 | O: THERE IS STOCK OF PRODUCT A. | O: Answer 1 |
| 5 | U: I'D LIKE TO BUY ONE. | U: Query 2 |
| 6 | O: MAY I HAVE YOUR NAME, ADDRESS, AND PHONE NUMBER? | O: Question 2 |
| 7 | O: FIRST, YOUR NAME, PLEASE. | |
| 8 | U: THIS IS ICHIRO NICHIDEN. | U: Answer 2 |
| 9 | O: ADDRESS, PLEASE. | O: Question 2 |
| 10 | U: 1-2-3 OO TOWN OO CITY, OO PREFECTURE. | U: Answer 2 |
| 11 | O: WHAT IS YOUR PHONE NUMBER? | |
| 12 | U: 12-3456-7890. | U: Answer 2 |
| 13 | O: YOUR ORDER FOR ONE PRODUCT A IS PLACED. | O: Answer 2 |
| 14 | O: IS THERE ANY OTHER QUESTION? | |
| 15 | U: ACTUALLY, I DON'T KNOW HOW TO RETURN PRODUCT I PURCHASED BEFORE. | U: Query 3 |
| 16 | O: WHAT IS PRODUCT YOU PURCHASED? | O: Question 3 |
| 17 | U: IT IS PRODUCT B. | U: Answer 3 |
| 18 | O: WHEN DID YOU PURCHASE? | O: Question 3 |
| 19 | U: THREE DAYS AGO. | U: Answer 3 |
| 20 | O: IT IS STILL IN COOLING-OFF PERIOD, AND PRODUCT CAN BE RETURNED. | O: Answer 3 |
| 21 | O: PLEASE FOLLOW INSTRUCTION ON WEBSITE AND COMPLETE PROCEDURE. | |

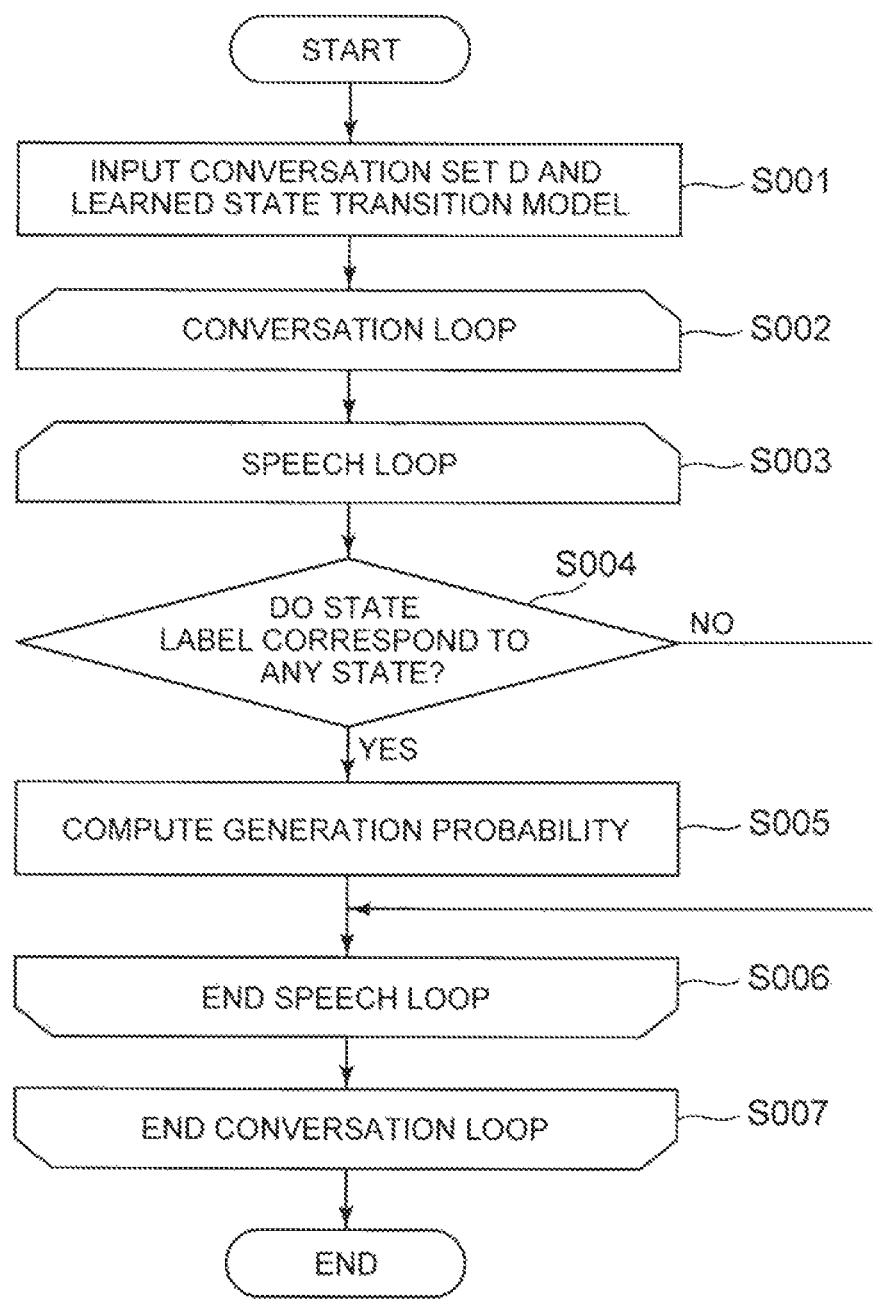

FIG. 6

| | CONVERSATION 1 | STATE LABEL |
|---|---|---|
| 1 | O: THIS IS OX SHOPPING MALL. | |
| 2 | U: IS THERE STOCK OF PRODUCT A? | U: Query 1 |
| 3 | O: OK, LET ME CHECK. | |
| 4 | O: THERE IS STOCK OF PRODUCT A. | O: Answer 1 |
| 5 | U: I'D LIKE TO BUY ONE. | U: Query 2 |
| 6 | O: MAY I HAVE YOUR NAME, ADDRESS, AND PHONE NUMBER? | O: Question 2 |
| 7 | O: FIRST, YOUR NAME, PLEASE. | |
| 8 | U: THIS IS ICHIRO NICHIDEN. | U: Answer 2 |
| 9 | O: ADDRESS, PLEASE. | O: Question 2 |
| 10 | U: 1-2-3 OO TOWN OO CITY, OO PREFECTURE. | U: Answer 2 |
| 11 | O: WHAT IS YOUR PHONE NUMBER? | O: Question 2 |
| 12 | U: 12-3456-7890. | U: Answer 2 |
| 13 | O: YOUR ORDER FOR ONE PRODUCT A IS PLACED. | O: Answer 2 |
| 14 | O: IS THERE ANY OTHER QUESTION? | |
| 15 | U: ACTUALLY, I DON'T KNOW HOW TO RETURN PRODUCT I PURCHASED BEFORE. | U: Query 3 |
| 16 | O: WHAT IS PRODUCT YOU PURCHASED? | O: Question 3 |
| 17 | U: IT IS PRODUCT B. | U: Answer 3 |
| 18 | O: WHEN DID YOU PURCHASE? | O: Question 3 |
| 19 | U: THREE DAYS AGO. | U: Answer 3 |
| 20 | O: IT IS STILL IN COOLING-OFF PERIOD, AND PRODUCT CAN BE RETURNED. | O: Answer 3 |
| 21 | O: PLEASE FOLLOW INSTRUCTION ON WEBSITE AND COMPLETE PROCEDURE. | |

FIG. 8

| | ACTION (Answer) | GENERATION PROBABILITY |
|---|---|---|
| IS THERE STOCK OF PRODUCT A? | THERE IS STOCK OF PRODUCT A. | 0.9 |
| | I AM SORRY BUT PRODUCT A IS OUT OF STOCK. | 0.8 |

| | YOUR NAME, PLEASE | ADDRESS, PLEASE | ... | WHAT IS YOUR PHONE NUMBER? | ACTION (Answer) | GENERATION PROBABILITY |
|---|---|---|---|---|---|---|
| I'D LIKE TO BUY ONE. | THIS IS ICHIRO NICHIDEN. | 1-2-3 OO TOWN OO CITY, OO PREFECTURE. | ... | 12-3456-7890 | YOUR ORDER FOR ONE PRODUCT A IS PLACED. | 0.95 |
| | THIS IS HANAKO NICHIDEN. | 4-5-6 △△ TOWN △△ CITY, △△ PREFECTURE. | ... | 98-7654-3210 | YOUR ORDER FOR ONE PRODUCT A IS PLACED. | 0.78 |

| | WHAT IS PRODUCT YOU PURCHASED? | WHEN DID YOU PURCHASE? | ... | DIAGNOSIS (Diagnosis) | ACTION (Answer) | GENERATION PROBABILITY |
|---|---|---|---|---|---|---|
| ACTUALLY, I DON'T KNOW HOW TO RETURN PRODUCT I PURCHASED BEFORE. | IT IS PRODUCT B. | THREE DAYS AGO. | ... | IT IS STILL IN COOLING-OFF PERIOD, AND PRODUCT CAN BE RETURNED. | PLEASE FOLLOW INSTRUCTION ON WEBSITE AND COMPLETE PROCEDURE. | 0.85 |
| | IT IS PRODUCT B. | THREE MONTHS AGO. | ... | I AM SORRY BUT PRODUCT PURCHASED MORE THAN ONE MONTH AGO CANNOT BE RETURNED. | I'D LIKE TO ASK QUESTION ABOUT YOUR OPINION ON PRODUCT B FOR FUTURE REFERENCE. | 0.82 |

FIG. 13

| ■PIZZA ORDER: | |
|---|---|
| BREAD DOUGH | |
| TYPE OF PIZZA | |
| TOPPING | |
| DESTINATION | |
| DELIVERY DATE AND TIME | |

QUESTION GROUP EXTRACTION METHOD, QUESTION GROUP EXTRACTION DEVICE, AND RECORDING MEDIUM

CROSS REFERENCE TO RELATED APPLICATIONS

This application is a National Stage of International Application No. PCT/JP2018/003843 filed Feb. 5, 2018.

TECHNICAL FIELD

The present invention relates to a question group extraction method, a question group extraction device, and a recording medium, and specifically relates to a question group extraction method, a question group extraction device, and a recording medium that can reduce a trouble of generating a question template in a slot fill-type dialogue system.

BACKGROUND ART

A chatbot is a program that can automatically conduct conversation through text or voice. The number of companies using a chatbot for customer care is increased.

For example, there is a slot fill-type dialogue system as a system that uses a chatbot. The slot fill-type dialogue system is a system that holds a list (template) of items (slot) asked to a user in order to achieve an arbitrary purpose, and that asks the user about an item that is not answered yet. Note that a value of a slot is also called a slot filler. Also, a template is also defined as a frame.

FIG. 13 is an explanatory diagram showing an example of a template required in a slot fill-type dialogue system. The template shown in FIG. 13 is a template used by the slot fill-type dialogue system when a pizza is ordered.

For example, the slot fill-type dialogue system asks a customer who orders a pizza about each of items "bread dough", a "type of pizza", "topping", a "destination", and a "delivery date and time" according to the template shown in FIG. 13.

In a case where the slot fill-type dialogue system is used, it takes time for an administrator to previously generate a template required for the slot fill-type dialogue system. Also, in a case where another system using a chatbot is used, it takes time for the administrator to previously generate a conversation flow that is a flow of a series of conversation required in the system.

For the above problems, a technology that can easily generate a template or a conversation flow has been proposed. For example, a topic dialogue method and system capable of conducting natural and intellectual dialogue between a computer and a human is described in Patent Literature (PTL) 1.

In the topic dialogue method described in PTL 1, in a case where an input voice does not include an information item required for identification of a record in a relational database, a user is asked back about the information item that is not included. By the asking back, all information items required to identify a record are found out in the topic dialogue method described in PTL 1.

In the topic dialogue method described in PTL 1, names of schemas such as a "destination", a "purpose", and the "number of days" are included in a sentence asked back and are asked in a process of asking back about an information item not included. That is, with the topic dialogue method described in PTL 1, it is possible to automatically generate a questionnaire that is for identification of a record and that is described in the above template.

Also, in the topic dialogue method described in PTL 1, in a case where an input voice does not include an information item required to identify knowledge-making data, a user is asked back about the information item not included. By the asking back, all the information items required for identification of the knowledge-making data are found out in the topic dialogue method described in PTL 1.

In the topic dialogue method described in PTL 1, in a process of asking back about an information item not included, a name of an attribute is included in a sentence asked back and is asked. An attribute is a frequently appearing word extracted from a database in which a document is registered. That is, with the topic dialogue method described in PTL 1, it is possible to automatically generate a questionnaire that is for identification of knowledge-making data and that is described in the above template.

Also, a dialogue system that appropriately processes re-entry by a user even when a case where the re-entry is performed is assumed and a dialogue scenario is not described is described in PTL 2.

Also, in PTL 3, a response sentence generation device that searches a dialogue corpus for a response candidate sentence that is the most appropriate as a response sentence for input user speech, corrects the found response candidate sentence, and outputs the corrected sentence as a response sentence for the input user speech is described.

Also, in Non Patent Literature (NPL) 1, a technology capable of extracting a slot candidate and a slot filler candidate by ranking output results from a semantic analyzer "SEMAFOR" is described. When slot candidates and slot filler candidates are extracted, the above template can be generated.

Also, in NPL 2, a technology capable of extracting a slot or a relationship between slots by using a relationship between words, a relationship between semantic labels, and a relationship between a word and a semantic label is described. When a slot or a relationship between slots are extracted, the above template can be generated.

Also, in NPL 3, a system that extracts and visualizes a question-answer group by associating a question group and an answer group for each topic in a meeting corpus is described.

Also, in PTL 4, a dialogue method that uses statistical information and that makes it possible to accurately identify information request contents from a user by using a statistical criterion acquired from past dialogue data is described.

CITATION LIST

Patent Literature

PTL 1: WO 2002/029633
PTL 2: Japanese Patent Application Laid-Open No. 2006-349954
PTL 3: Japanese Patent Application Laid-Open No. 2007-102104
PTL 4: Japanese Patent Application Laid-Open No. 2004-354787

Non Patent Literature

NPL 1: Yun-Nung Chen, William Yang Wang, and Alexander IRudnicky, "Unsupervised induction and filling of semantic slots for spoken dialogue systems using frame-semantic parsing," in Automatic Speech Recognition and Understanding (ASRU), IEEE Workshop on, pages 120-125, 2013.

NPL 2: Yun-Nung Chen, William Yang Wang, and Alexander IRudnicky, "Jointly Modeling Inter-Slot Relations by Random Walk on Knowledge Graphs for Unsupervised Spoken Language Understanding," in Proceedings of NAACL-HLT, pages 619-629, 2015.

NPL 3: Yuma Hayashi and Hayato Yamana, "System of automatically generating a discussion map from proceedings by structuring a relationship between speeches", DEIM 2016.

SUMMARY OF INVENTION

Technical Problem

In the topic dialogue method described in PTL 1, the dialogue system described in PTL 2, the response sentence generation device described in PTL 3, and the technologies described in NPL 1 to NPL 2, extracting question groups related to an arbitrary topic from conversation after grouping thereof is not expected.

For example, the technology described in NPL 2 does not consider appearance order or adjacency of words in a document. Thus, the technology described in NPL 2 cannot extract a question group for each topic from a conversation including a plurality of topics.

In the technology described in NPL 3, question groups related to an arbitrary topic can be grouped and extracted. However, in the technology described in NPL 3, a topic is selected by utilization of an annotation (metadata) in a meeting corpus. Thus, it is not possible to extract a question group related to an arbitrary topic from a conversation history with no annotation.

Also, in each of the technologies described in PTL 1 to PTL 3, although it is possible to ask a user a question, it is not possible to provide the user with a cause or an answer (action) determined on the basis of an answer from the user to the question.

Object of Invention

Thus, the present invention is to provide a question group extraction method, a question group extraction device, and a recording medium that can easily extract a question group related to an arbitrary topic from a conversation history and that solve the above-described problems.

Solution to Problem

A question group extraction method according to the present invention includes: with regard to data indicating a conversation history including one or more sets of sentences formed from a problem sentence being a sentence indicating one problem, a question sentence being a sentence indicating a question for the one problem, and an answer sentence being a sentence indicating an answer to the question, adding a label indicating a problem state to the problem sentence within the data, a label indicating a question state to the question sentence within the data, and a label indicating an answer state to the answer sentence within the data; and extracting, from the data, a set of sentences with which the states indicated by the labels have been associated according to a state transition model that is a model configured from the one problem state, question state, and answer state, and that represents a transition of the states.

A question group extraction device according to the present invention includes: an addition unit which, with regard to data indicating a conversation history including one or more sets of sentences formed from a problem sentence being a sentence indicating one problem, a question sentence being a sentence indicating a question for the one problem, and an answer sentence being a sentence indicating an answer to the question, adds a label indicating a problem state to the problem sentence within the data, a label indicating a question state to the question sentence within the data, and a label indicating an answer state to the answer sentence within the data; and an extraction unit which extracts, from the data, a set of sentences with which the states indicated by the labels have been associated according to a state transition model that is a model configured from the one problem state, question state, and answer state, and that represents a transition of the states.

A non-transitory computer-readable recording medium that records a question group extraction program according to the present invention stores the question group extraction program that with regard to data indicating a conversation history including one or more sets of sentences formed from a problem sentence being a sentence indicating one problem, a question sentence being a sentence indicating a question for the one problem, and an answer sentence being a sentence indicating an answer to the question, adds a label indicating a problem state to the problem sentence within the data, a label indicating a question state to the question sentence within the data, and a label indicating an answer state to the answer sentence within the data, and extracts, from the data, a set of sentences with which the states indicated by the labels have been associated according to a state transition model that is a model configured from the one problem state, question state, and answer state, and that represents a transition of the states when being executed by a computer.

Advantageous Effects of Invention

According to the present invention, it is possible to easily extract a question group related to an arbitrary topic from a conversation history.

BRIEF DESCRIPTION OF DRAWINGS

FIG. 2 is an explanatory diagram showing an example of various kinds of data that are used in a learning phase and that are received by a learning reception unit 111.

FIG. 3 is an explanatory diagram showing an example of a conversation history in which a state label is added to each speech.

FIG. 4 is an explanatory diagram showing an example of an alignment.

FIG. 5 is a flowchart showing an operation of generation probability computation processing by a generation probability computation unit 124 of the first exemplary embodiment.

FIG. 6 is an explanatory diagram showing another example of an alignment.

FIG. 8 is an explanatory diagram showing another example of grouped question groups output by the output unit 125.

FIG. 13 is an explanatory diagram showing an example of a template required in a slot fill-type dialogue system.

DESCRIPTION OF EMBODIMENTS

First Exemplary Embodiment

[Description of Configuration]

Figure 1:
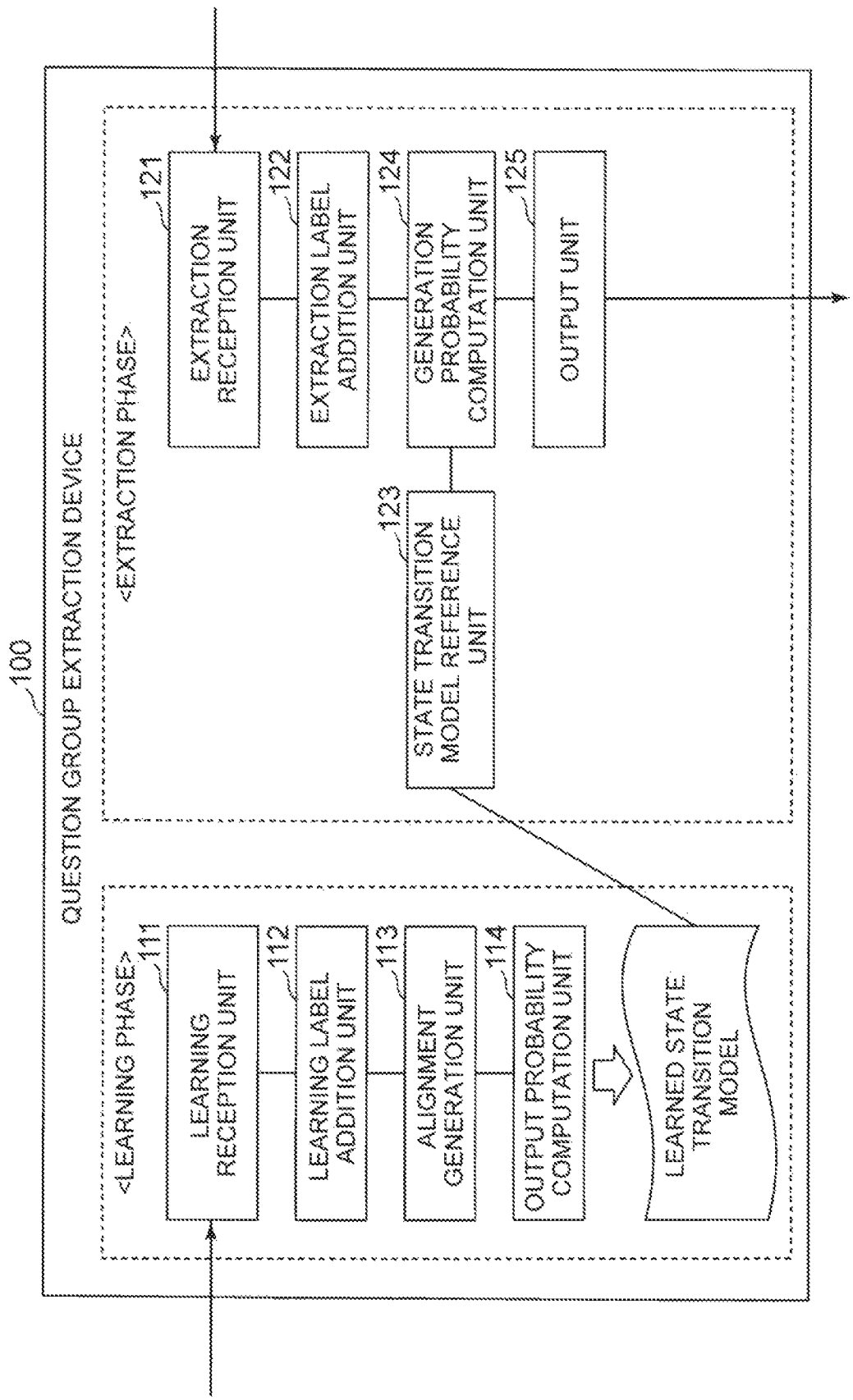
FIG. 1 is a block diagram showing a configuration example of a first exemplary embodiment of a question group extraction device according to the present invention.

In the following, exemplary embodiments of the present invention will be described with reference to the drawings. FIG. 1 is a block diagram showing a configuration example of a first exemplary embodiment of a question group extraction device according to the present invention.

As shown in FIG. 1, a question group extraction device 100 of the present exemplary embodiment includes a learning reception unit 111, a learning label addition unit 112, an alignment generation unit 113, an output probability computation unit 114, an extraction reception unit 121, an extraction label addition unit 122, a state transition model reference unit 123, a generation probability computation unit 124, and an output unit 125.

The question group extraction device 100 of the present exemplary embodiment is used for a purpose of preparing a template required in the above-described dialogue system. To the question group extraction device 100, conversation history data that is data indicating a conversation history is input. When the conversation history data is input, the question group extraction device 100 outputs a question group in the conversation history which question group is a source of a template.

After grouping, the question group extraction device 100 of the present exemplary embodiment extracts, from the conversation history, a question (problem) from a customer, a question from an operator for a clarification of a situation of the customer, and an answer of the customer to the question from the operator, for example.

Furthermore, the question group extraction device 100 of the present exemplary embodiment also extracts a cause determination result, and an answer (action) by the operator from the conversation history and performs addition thereof to the group. That is, the question group extraction device 100 extracts, from the conversation history, a group including a "problem of a customer", a "first question from the customer", a "first answer from an operator", a "next question from the customer", a "next answer from the operator", and the like.

Thus, the question group extraction device 100 of the present exemplary embodiment can extract question groups related to an arbitrary purpose after grouping thereof. Also, the question group extraction device 100 can provide a cause determination result or an action, which is based on an answer to a question, after inclusion thereof in the group.

In the following, a detailed configuration and function of the question group extraction device 100 of the present exemplary embodiment will be described. Note that a hidden Markov model technology is used in the question group extraction device 100 of the present exemplary embodiment.

As shown in FIG. 1, the question group extraction device 100 of the present exemplary embodiment includes a component that operates in a learning phase of learning an output probability of a state transition model (described later), and a component that operates in an extraction phase of extracting a question group from a set of conversations. First, a function and the like of a component operating in the learning phase will be described.

The learning reception unit 111 has a function of receiving various kinds of data used in the learning phase. For example, the learning reception unit 111 receives a state transition model, a label addition pattern, and conversation history data.

FIG. 2 is an explanatory diagram showing an example of various kinds of data that are used in the learning phase and that are received by the learning reception unit 111. The upper of FIG. 2 shows an example of a state transition model. In the state transition model shown in the upper of FIG. 2, a state during conversation is defined. An ellipse shown in the upper of FIG. 2 represents a state during the conversation.

In the present exemplary embodiment, it is basically assumed that a conversation having the following contents is held between a customer and an operator.

1. A customer states a query including a problem.
2. An operator asks a question to clarify a situation of the customer.
3. The customer answers the question.
4. The operator states a cause for the problem of the customer.
5. The operator takes action for the problem of the customer.

Note that there is a possibility that a question from the operator in 2. and a response from the customer in 3. are made repeatedly for a plurality of times during the conversation.

The state transition model shown in the upper of FIG. 2 includes a state "U: Query", a state "O: Question", a state "U: Answer", a state "O: Diagnosis", and a state "O: Answer". The states respectively correspond to states in the conversation which states are a question from the customer (presentation of problem) in 1., a question from the operator in 2., a response from the customer to the question in 3., an answer from the operator in 4., and an action by the operator in 5. Note that "U" means a customer, and "O" means an operator.

Also, the state transition model shown in the upper of FIG. 2 also defines a transition between states during conversation. Arrows shown in the upper of FIG. 2 represent transitions between states during the conversation.

For example, only a transition to the state "O: Question" is defined in the state "U: Query". Also, a transition to the state "O: Question", a transition to the state "O: Diagnosis", and a transition to the state "O: Answer" are defined in the state "U: Answer".

That is, even in a case where there is a plurality of questions in 2. and responses in 3. in the conversation, all of the questions in 2. correspond to the state "O: Question" and all of the responses in 3. correspond to the state "U: Answer".

Also, a transition probability between states in the conversation is also defined in the state transition model shown in the upper of FIG. 2. Numerical values associated with the arrows shown in the upper of FIG. 2 represent transition probabilities between states.

For example, the state "U: Query" transitions to the state "O: Question" with a probability of "0.7". A transition probability is manually added to a transition between states by a rule of thumb, for example.

The middle of FIG. 2 shows an example of a label addition pattern. The label addition pattern shown in the middle of FIG. 2 includes a state label and a pattern.

The state label is a label corresponding to any of the states defined in the state transition model. The pattern is a pattern that represents a condition of a speech to which a state label is added. For example, the pattern represents a condition in which a regular expression such as ".*desuka" is used. A state label indicating a "question" is added to a speech corresponding to the condition ".*desuka".

The lower of FIG. 2 shows an example of conversation history data. The conversation history data is history data of a plurality of conversations between a customer and an operator. In the following, it is assumed that the conversation history data represents a "set of conversations D".

Note that one table shown in the lower of FIG. 2 represents one conversation. Also, one row in the table represents one speech.

Note that the state transition model and the label addition pattern are data previously set in the question group extraction device 100 via the learning reception unit 111. Also, the conversation history data is data that is input when an output probability is learned and when a question group is extracted.

The learning label addition unit 112 has a function of adding a state label to each speech in the conversation history data by using the label addition pattern. The learning label addition unit 112 adds a state label to each speech, for example, according to a pattern representing a condition in which the regular expression is used.

FIG. 3 is an explanatory diagram showing an example of a conversation history in which a state label is added to each speech. In a second column shown in FIG. 3, a conversation history of a "conversation 1" is described. Also, in a third column shown in FIG. 3, a state label added to each speech is described. Note that for convenience of a description, a row number is described in a first column shown in FIG. 3.

As shown in FIG. 3, a state label is added to each speech. Note that a speech in which no state label is described is a speech which does not corresponds to any condition represented by the patterns and to which no state label is added by the learning label addition unit 112.

The alignment generation unit 113 has a function of generating an alignment with reference to a label addition result that is conversation history data to which a state label is added and that is input from the learning label addition unit 112, and the state transition model.

The alignment is a conversation history in which each state in the state transition model is added to each speech on the basis of the state label. The alignment generation unit 113 performs all possible addition of each state in the state transition model to each state label in the label addition result. That is, the alignment generation unit 113 can generate a plurality of alignments in which the state transitions indicated by the state transition model and appearance order of the state labels do not conflict.

FIG. 4 is an explanatory diagram showing an example of the alignment. A meaning of each notation shown in FIG. 4 is similar to a meaning of the notation shown in FIG. 3.

Unlike the state labels shown in FIG. 3, state labels shown in FIG. 4 are provided with numbers. Speeches to which state labels with the same number are added are speeches added to a state transition model related to the same topic.

For example, state labels of speeches in the 15th to 20th rows are arranged in order of "U: Query"→"O: Question"→"U: Answer"→"O: Question"→"U: Answer"→"O: Answer". That is, since the arrangement order of the state labels corresponds to one kind of transition order of states in the state transition models shown in the upper of FIG. 2, a state transition model related to the same topic is added to each of the speeches in the 15th to 20th rows.

For the other speeches, a state transition model related to the same topic is added in a similar manner. That is, according to the state transition model, a state indicated by a state label is associated with a set of speeches included in the alignment.

The output probability computation unit 114 has a function of computing an output probability, which is a probability that a morpheme in a speech is acquired from an arbitrary state in a state transition model, on the basis of an alignment input from the alignment generation unit 113. An output probability P that is a probability that a morpheme a in a speech is acquired from a state S is computed as follows, for example.

Output probability P (morpheme a|state $S$)=(correspondence frequency of state $S$→morpheme $a$)/(correspondence frequency of state $S$→all morpheme) . . .  Expression (1)

"State $S$→morpheme a" in Expression (1) means that the morpheme a is acquired from a speech corresponding to the state S in the state transition model. Also, "state $S$→all morpheme" means that all morphemes are acquired from a speech corresponding to the state S in the state transition model. Also, "|" is a symbol used to express a conditional probability. Note that the output probability computation unit 114 may compute the output probability by a computation expression other than Expression (1).

As described above, the output probability computation unit 114 computes an output probability related to a morpheme in a speech on the basis of a generated alignment and a state transition model. The output probability computation unit 114 takes the average of output probabilities of all alignments generated by the alignment generation unit 113, for example.

That is, after an output probability in a state transition model which probability is computed by the above method is learned for a set of conversations D, the output probability computation unit 114 outputs the state transition model as a "learned state transition model". Note that the computed output probability is included in the learned state transition model.

Next, a function and the like of a component operating in the extraction phase will be described. The extraction reception unit 121 has a function of receiving conversation history data that is an extraction target of a question group. The extraction reception unit 121 inputs the received conversation history data to the extraction label addition unit 122.

The extraction label addition unit 122 has a function of adding a state label to each speech in the conversation history data by using a label addition pattern. The function of the extraction label addition unit 122 is similar to the function of the learning label addition unit 112. The extraction label addition unit 122 inputs a label addition result to the generation probability computation unit 124.

The state transition model reference unit 123 has a function of referring to the learned state transition model the output probability of which is learned in the learning phase. The state transition model reference unit 123 inputs the referenced learned state transition model to the generation probability computation unit 124.

The generation probability computation unit 124 has a function of computing, for each speech, a generation probability used for extraction of a question group. In the following, an operation by the generation probability computation unit 124 to compute a generation probability will be described with reference to FIG. 5. FIG. 5 is a flowchart showing an operation of generation probability computation processing by the generation probability computation unit 124 of the first exemplary embodiment.

To the generation probability computation unit 124, a set of conversations D to which a state label is added is input from the extraction label addition unit 122 and a learned state transition model an output probability of which is learned is input from the state transition model reference unit 123 (Step S001).

The generation probability computation unit 124 selects, in the set of conversations D, one conversation history d for which a generation probability is not yet computed. That is, entering into a conversation loop is performed (Step S002).

Then, the generation probability computation unit 124 selects, in the selected conversation history d, one speech u for which a generation probability is not yet computed. That is, entering into a speech loop is performed (Step S003).

The generation probability computation unit 124 checks whether or not a state indicated by a state label added to the selected speech u corresponds to any state in the learned state transition model (Step S004). In a case where there is no correspondence to any of the states in the learned state transition model (No in Step S004), the generation probability computation unit 124 performs processing in Step S006.

In a case where there is a correspondence to any of the states in the learned state transition model (Yes in Step S004), the generation probability computation unit 124 computes, for each speech in and after the speech u in the conversation history d, a generation probability that is a probability that a morpheme in the speech is generated from an arbitrary state in the learned state transition model (Step S005).

The generation probability is a probability that a morpheme is generated from an arbitrary state in the learned state transition model. For example, this is a probability that each of morphemes "product A", "no", "stock", "ha", "aru", "masu", and "ka" is generated from the state "U: Query". The generation probability of each speech is computed as follows, for example.

Generation probability=$AVR$ (transition probability $P$ (state $S_t$|state $S_{t-1}$)*$AVR$ (output probability $P$ (morpheme $b$|state $S_t$))) $-c$*(sum of distance from speech matching previous state) ... Expression (2)

Note that t in Expression (2) is a subscript indicating a time point, and $S_t$ means a state at the time point t. For example, when the state $S_t$ at the time point t is the state "O: Question", the state $S_{t-1}$ at a time point (t−1) is the state "U: Query".

Also, the "AVR (output probability P (morpheme b|state S))" in Expression (2) is an average of output probabilities acquired from the state S over all morphemes in one speech. Also, the "transition probability P (state $S_t$|state $S_{t-1}$)" is a transition probability from the state $S_{t-1}$ to the state $S_t$. Also, the first "AVR" means to take the average over all states in the learned state transition model.

Also, the "distance from speech matching previous state" is a distance from a speech that matches a previous state of a state corresponding to a speech for which a generation probability is computed. For example, when there is no other speech between two speeches, the distance is Also, when there is one speech between two speeches, the distance is "2". Since there is a plurality of "previous states", the sum of distances over the plurality of "previous states" is computed in Expression (2). Also, c is a parameter.

That is, the generation probability computation unit 124 computes a state transition probability, an output probability, and a distance from a previous state in the computation of a generation probability. Note that the distance from a previous state represents adjacency between speeches.

The generation probability computation unit 124 computes a generation probability for each speech in and after the speech u. Note that the generation probability computation unit 124 may compute a generation probability by a computation expression other than Expression (2).

The generation probability computation unit 124 repeats the processing in Step S004 to Step S005 while there is a speech a generation probability of which is not yet computed in the selected conversation history d. When generation probabilities of all speeches in the conversation history d are computed, the generation probability computation unit 124 exits the speech loop (Step S006).

The generation probability computation unit 124 repeatedly performs the processing in Step S003 to Step S006 while there is a conversation history a generation probability of which is not yet computed in the set of conversations D. When generation probabilities of all conversation histories d included in the set of conversations D are computed, the generation probability computation unit 124 exits the conversation loop (Step S007) and ends the generation probability computation processing.

The generation probability computation unit 124 readds a state label to each speech in the set of conversations D on the basis of a computation result of the generation probabilities. The generation probability computation unit 124 generates a new alignment by readding a state label in consideration of a state transition probability, an output probability, and adjacency.

For example, the generation probability computation unit 124 readds a state label to a speech, to which a state label is not added, among speeches in which the computed generation probabilities are equal to or larger than a predetermined value. When readding the state label, the generation probability computation unit 124 generates a new alignment with reference to the updated label addition result and the learned state transition model.

FIG. 6 is an explanatory diagram showing another example of an alignment. Compared to the alignment shown in FIG. 4, "O: Question2" is newly added as a state label to a speech in an 11th row a generation probability of which speech is equal to or larger than a predetermined value.

Also, compared to the alignment shown in FIG. 4, a state label "O: Question2" added to a speech in the 6th row is deleted and readded to a speech in the 7th row. This is because a generation probability of the speech in the sixth row is smaller than the predetermined value and a generation probability of the speech in the seventh row is equal to or larger than the predetermined value. The generation probability computation unit 124 inputs the generated new alignment to the output unit 125.

The output unit 125 has a function of grouping, for each topic, speech parts (such as sentence or phrase) corresponding to an item that corresponds to a state in a state transition model in the input alignment, and of performing an output thereof. For example, the output unit 125 extracts a speech having a generation probability equal to or larger than a threshold among speeches corresponding to each state, and generates a question group.

That is, the output unit 125 extracts a question group from the set of conversations D. Note that the question group extracted in the present exemplary embodiment includes a problem, answer, and the like in addition to a question, as described later. The output unit 125 adds the generated question group to an output list.

Figure 7:
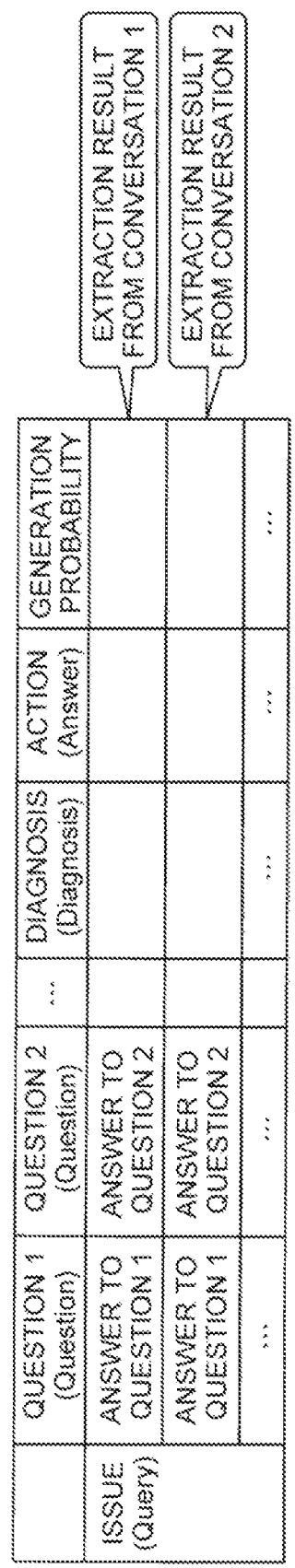
FIG. 7 is an explanatory diagram showing an example of grouped question groups output by an output unit 125.

FIG. 7 is an explanatory diagram showing an example of grouped question groups output by the output unit 125. An issue (Query) shown in FIG. 7 corresponds to a question (presentation of problem) from a customer. As shown in FIG. 7, the question group includes a question 1 from an operator (Question), a question 2 from the operator (Question), an action to the problem of the customer from the operator (Answer), and a generation probability.

Each question includes an answer returned from the customer in the conversation. Also, the question group may include an answer from the operator (Diagnosis) corresponding to a cause determination result with respect to the problem of the customer. Also, the question group may include an identifier that uniquely identifies the problem of the customer.

Also, a question group in the first row shown in FIG. 7 is an extraction result from a "conversation 1", and a question group in the second row is an extraction result from a "conversation 2". That is, the output unit 125 can collectively output, in a format as shown in FIG. 7, a plurality of question groups related to a problem of the same customer which groups are extracted from different conversation histories.

Note that there is a possibility that problems and questions having similar meanings are expressed in different wording in the plurality of question groups extracted from the different conversation histories. The output unit 125 may merge questions having the same meaning by using a technology such as implication clustering after extracting each of the plurality of question groups.

FIG. 8 is an explanatory diagram showing another example of grouped question groups output by the output unit 125. A question group shown in the upper of FIG. 8 is the simplest form of a question group that includes only a problem of a customer, action by an operator, and a generation probability.

A question group shown in the middle of FIG. 8 includes a problem of a customer, a plurality of questions from an operator, an action by the operator, and a generation probability. Also, contents of a response from the customer and contents of the action by the operator are described. As shown in the middle of FIG. 8, items described in a template generated by the question group extraction device 100 of the present exemplary embodiment include not only a noun phrase but also a question sentence.

A question group shown in the lower of FIG. 8 includes a problem by a customer, a plurality of questions from an operator, an answer from the operator, an action by the operator, and a generation probability. Also, contents of a response from the customer and contents of the action by the operator are described.

The output unit 125 outputs a list of question groups as shown in FIG. 8. Note that the output unit 125 may output a question group in a format other than the formats shown in FIG. 7 to FIG. 8.

[Description of Operation]

Figure 9:
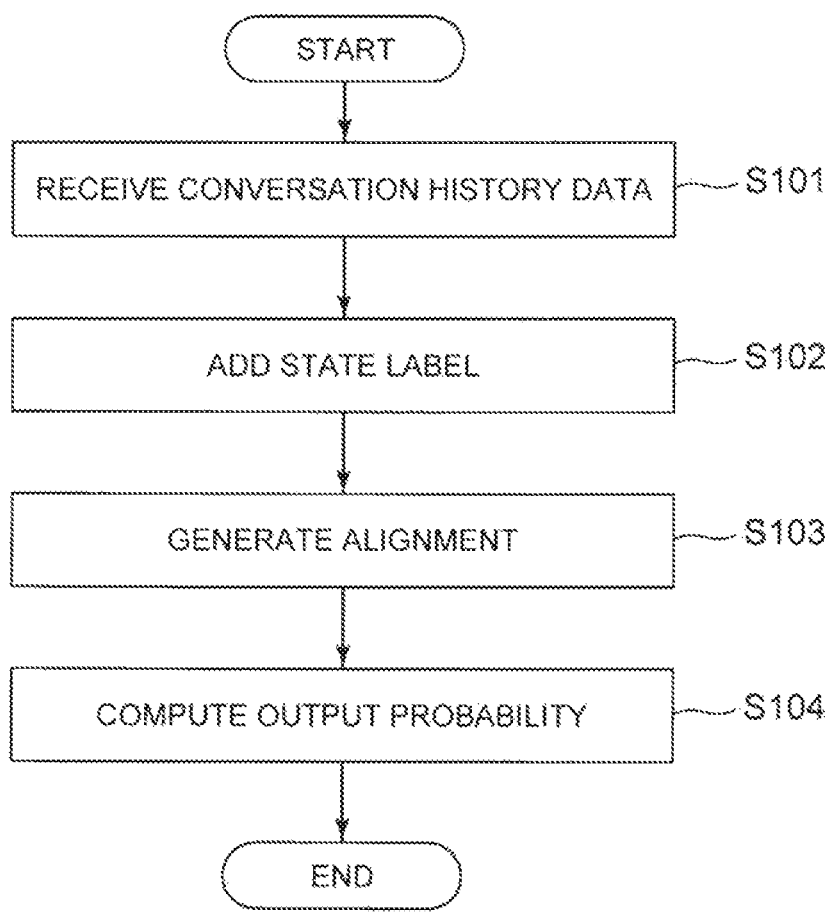
FIG. 9 is a flowchart showing an operation of output probability learning processing by a question group extraction device 100 of the first exemplary embodiment.

In the following, an operation by the question group extraction device 100 of the present exemplary embodiment to learn an output probability of a state transition model will be described with reference to FIG. 9. FIG. 9 is a flowchart showing the operation of output probability learning processing by the question group extraction device 100 of the first exemplary embodiment. Note that in the present example, a state transition model and a label addition pattern are previously set in the question group extraction device 100.

The learning reception unit 111 receives input conversation history data (Step S101). Then, the learning reception unit 111 inputs the received conversation history data to the learning label addition unit 112.

Then, the learning label addition unit 112 adds a state label to each speech in the input conversation history data by using a label addition pattern (Step S102). The learning label addition unit 112 inputs a label addition result, which is the conversation history data to which the state label is added, to the alignment generation unit 113.

Then, the alignment generation unit 113 generates an alignment with reference to the label addition result, which is input from the learning label addition unit 112, and the state transition model (Step S103). The alignment generation unit 113 inputs the generated alignment to the output probability computation unit 114.

Then, the output probability computation unit 114 computes an output probability, which is a probability that a morpheme in each speech is acquired from an arbitrary state, on the basis of the alignment input from the alignment generation unit 113 (Step S104). After computation of the output probability, the question group extraction device 100 ends the output probability learning processing.

Figure 10:
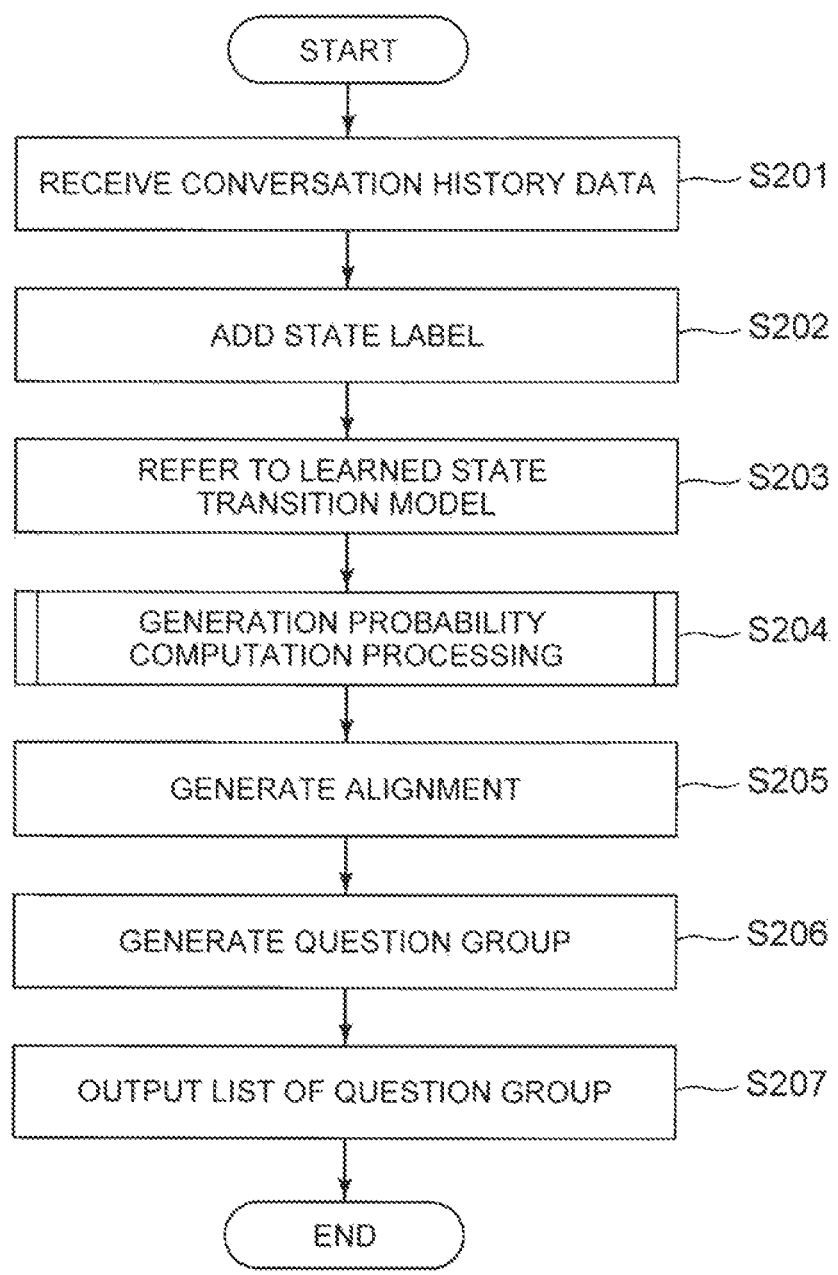
FIG. 10 is a flowchart showing an operation of question group list output processing by the question group extraction device 100 of the first exemplary embodiment.

Next, an operation by the question group extraction device 100 of the present exemplary embodiment to output a list of question groups will be described with reference to FIG. 10. FIG. 10 is a flowchart showing the operation of question group list output processing by the question group extraction device 100 of the first exemplary embodiment.

The extraction reception unit 121 receives input conversation history data (Step S201). Then, the extraction reception unit 121 inputs the received conversation history data to the extraction label addition unit 122.

Then, the extraction label addition unit 122 adds a state label to each speech in the input conversation history data by using a label addition pattern (Step S202). The extraction label addition unit 122 inputs a label addition result, which is the conversation history data to which the state label is added, to the generation probability computation unit 124.

Then, the state transition model reference unit 123 refers to a learned state transition model an output probability of which is learned (Step S203). The state transition model reference unit 123 inputs the referenced learned state transition model to the generation probability computation unit 124.

Then, the generation probability computation unit 124 executes the generation probability computation processing shown in FIG. 5 (Step S204). After the generation probability computation processing is over, the generation probability computation unit 124 readds a state label to each speech in the conversation history data on the basis of the computed generation probability.

When readding the state label, the generation probability computation unit 124 generates an alignment with reference to the updated label addition result and the learned state transition model (Step S205). The generation probability computation unit 124 inputs, to the output unit 125, the new alignment to which the state label is readded.

Then, the output unit 125 extracts, from the input alignment, a speech having a generation probability equal to or larger than a threshold among speeches corresponding to each state, and generates a question group (Step S206). The output unit 125 adds the generated question group to an output list.

The output unit 125 may merge a plurality of question groups related to a problem of the same customer in the output list. Then, the output unit 125 outputs the generated list of question groups (Step S207). After outputting the list of question groups, the question group extraction device 100 ends the question group list output processing.

[Description of Effect]

A question group extraction device 100 of the present exemplary embodiment is a device that extracts a question group from conversation history data. A learning label addition unit 112 of the question group extraction device 100 adds a state label to each speech in the conversation history data by using a regular expression or the like.

Also, by using a state transition model, an alignment generation unit 113 generates an alignment on the basis of the conversation history data to which the state label is added. Also, an output probability computation unit 114 learns an output probability related to the state transition model by using the generated alignment.

Also, a generation probability computation unit 124 computes a generation probability related to an input set of conversations on the basis of the learned state transition model. Also, an output unit 125 groups, for each topic, speech parts respectively corresponding to items extracted from the alignment on the basis of the generation probability, and performs an output thereof.

In the technologies described in PTL 1 to PTL 3 and the technologies described in NPL 1 to NPL 2, slot (question) candidates are ranked by utilization of a frequency or a consistency score in a document and a slot is extracted.

However, since appearance order and adjacency in the document are not considered, it is not possible to group and extracts question groups for each topic in a case where a plurality of topics is included in one conversation in the technologies described in PTL 1 to PTL 3 and the technologies described in NPL 1 to NPL 2.

In the question group extraction device 100 of the present exemplary embodiment, the generation probability computation unit 124 computes a generation probability considering appearance order or adjacency by using the learned state transition model, and generates an alignment on the basis of the generation probability. Then, since the output unit 125 extracts question groups for each topic from the alignment on the basis of the generation probability, the question group extraction device 100 can group and extract the question groups for each topic. Since question groups related to the same topic are adjacent in conversation, the question groups are more securely extracted for each topic when adjacency is considered.

Also, unlike the technology described in NPL 3, the question group extraction device 100 of the present exemplary embodiment extracts question groups for each topic by using a label addition pattern and a state transition model. Thus, it is possible to extract a question group from conversation history data with no annotation.

Figure 11:
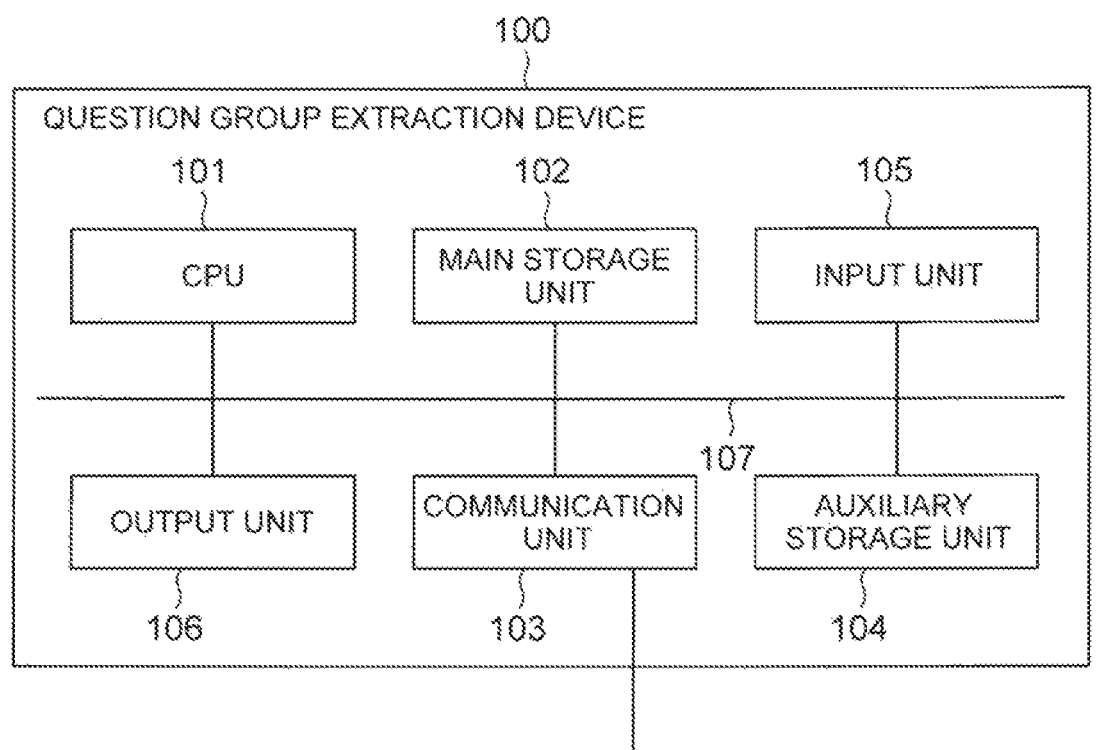
FIG. 11 is an explanatory diagram showing a hardware configuration example of the question group extraction device according to the present invention.

In the following, a detailed example of a hardware configuration of the question group extraction device 100 of the present exemplary embodiment will be described. FIG. 11 is an explanatory diagram showing a hardware configuration example of a question group extraction device according to the present invention.

The question group extraction device 100 shown in FIG. 11 includes a central processing unit (CPU) 101, a main storage unit 102, a communication unit 103, and an auxiliary storage unit 104. Also, an input unit 105 to be operated by a user and an output unit 106 to present a processing result or a progress of processing contents to the user may be included.

The main storage unit 102 is used as a data work area or a data temporary save area. The main storage unit 102 is, for example, a random access memory (RAM).

The communication unit 103 has a function of performing an input and output of data with respect to a peripheral device via a wired network or a wireless network (information communication network).

The auxiliary storage unit 104 is a non-transitory tangible storage medium. For example, as a non-transitory tangible medium, there is a magnetic disk, a magneto-optical disk, a compact disk read only memory (CD-ROM), a digital versatile disk read only memory (DVD-ROM), a semiconductor memory, or the like.

The input unit 105 has a function of inputting data or a processing instruction. The input unit 105 is an input device such as a keyboard or a mouse.

The output unit 106 has a function of outputting data. The output unit 106 is, for example, a display device such as a liquid crystal display device, or a printing device such as a printer.

Also, as shown in FIG. 11, in the question group extraction device 100, each component is connected to a system bus 107.

For example, the auxiliary storage unit 104 includes a program of realizing the learning reception unit 111, the learning label addition unit 112, the alignment generation unit 113, the output probability computation unit 114, the extraction reception unit 121, the extraction label addition unit 122, the state transition model reference unit 123, the generation probability computation unit 124, and the output unit 125 shown in FIG. 1.

Also, the learning reception unit 111 and the extraction reception unit 121 may receive conversation history data via the communication unit 103.

Note that the question group extraction device 100 may be realized by hardware. For example, a circuit including a hardware component such as large scale integration (LSI) in which a program that realizes the function shown in FIG. 1 is embedded inside may be mounted on the question group extraction device 100.

Also, the question group extraction device 100 may be realized by software by execution of a program, which provides a function of each component shown in FIG. 1, by the CPU 101 shown in FIG. 11.

In a case of being realized by software, the CPU 101 loads and executes the program, which is stored in the auxiliary storage unit 104, in the main storage unit 102 and controls an operation of the question group extraction device 100, whereby each function is realized by software.

Also, a part or whole of each component may be realized by general-purpose circuitry or dedicated circuitry, a processor, or the like or a combination thereof These may include a single chip or may include a plurality of chips connected via a bus. Also, a part or whole of each component may be realized by a combination of the above-described circuitry or the like with the program.

In a case where a part or whole of each component is realized by a plurality of information processing devices, circuitry, or the like, the plurality of information processing devices, circuitry, or the like may be collectively arranged or dispersedly arranged. The information processing devices, circuitry, and the like may be realized as a form of being connected via a communication network, for example, as a client and server system or a cloud computing system.

Figure 12:
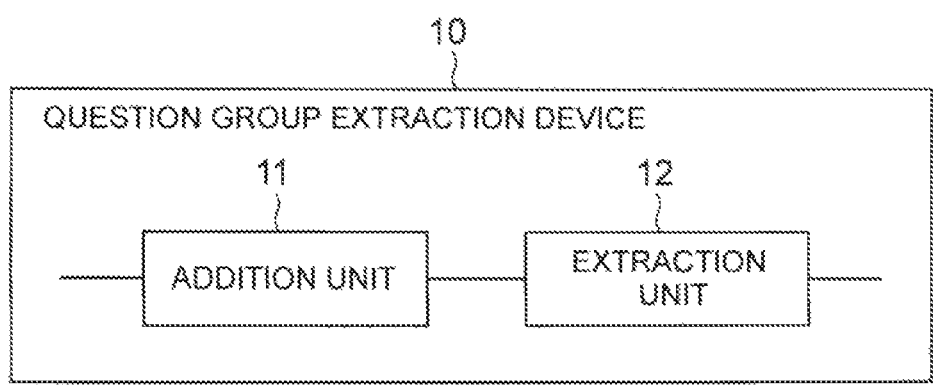
FIG. 12 is a block diagram showing an outline of the question group extraction device according to the present invention.

Next, an outline of the present invention will be described. FIG. 12 is a block diagram showing an outline of the question group extraction device according to the present invention. A question group extraction device 10 according to the present invention includes: an addition unit 11 (such as extraction label addition unit 122) that with regard to data indicating a conversation history including one or more sets of sentences formed from a problem sentence being a sentence indicating one problem, a question sentence being a sentence indicating a question for the one problem, and an answer sentence being a sentence indicating an answer to the question, adds a label indicating a problem state (such as state "Query") to the problem sentence within the data, a label indicating a question state (such as state "Question") to the question sentence within the data, and a label indicating an answer state (such as state "Answer") to the answer sentence within the data; and an extraction unit 12 (such as generation probability computation unit 124) that extracts, from the data, a set of sentences (such as question group) with which the states indicated by the labels have been associated according to a state transition model that is a model configured from the one problem state, question state, and answer state, and that represents a transition of the states.

With such a configuration, the question group extraction device can easily extract a question group related to an arbitrary topic from a conversation history.

Note that the above sentence is not limited to a notation delimited by punctuation. The above sentence may be one post in speech, a phrase, or chat.

Also, the extraction unit 12 may extract the sets of sentences from the data indicating the conversation history as many as the number of the sets of sentences included in the conversation history.

With such a configuration, the question group extraction device can extract a question group for each topic from the conversation history.

Also, the question group extraction device 10 may include a correction unit (such as generation probability computation unit 124) that corrects the labels added to the sentences within the data indicating the conversation history by utilization of the state transition model, and the extraction unit 12 may extract the sets of sentences from the data in which the labels are corrected by the correction unit.

With such a configuration, the question group extraction device can extract a question group including a question more related to a topic.

Also, the correction unit may correct the labels on the basis of a generation probability that is a probability that a morpheme included in a sentence is generated from an arbitrary state in the state transition model.

With such a configuration, the question group extraction device can extract a question group including a question more related to a topic.

Also, the question group extraction device 10 may include a learning unit (such as output probability computation unit 114) that learns a degree of correspondence of the morpheme included in the sentence to the arbitrary state in the state transition model, and the correction unit may compute the generation probability by utilization of the learned degree.

With such a configuration, the question group extraction device can improve accuracy of a computed generation probability.

Also, the correction unit may compute the generation probability by utilization of a distance, in the conversation history, between a sentence including the morpheme the generation probability of which is computed and a sentence to which a label indicating a state before a transition in the state transition model to a state indicated by a label added to the sentence is added.

With such a configuration, the question group extraction device can improve accuracy of a computed generation probability.

Also, the question group extraction device 10 may include an output unit (such as output unit 125) that outputs an extracted set of sentences, and the output unit may group and output a plurality of sets of sentences including problem sentences indicating the same problem.

With such a configuration, the question group extraction device can present an extracted question group to a user in a more easily understandable manner.

Also, the state transition model may include a conclusion state (such as state "Diagnosis"), and the addition unit 11 may add a label indicating the conclusion state to a conclusion sentence being a sentence indicating a conclusion (such as answer by operator) for one problem indicated by a problem sentence within the data indicating the conversation history, and the extraction unit 12 may extract a set of sentences including the conclusion sentence.

With such a configuration, the question group extraction device can also present a user with a conclusion candidate for each problem together with a question group.

Also, after including a sentence indicating action contents (such as action by operator) corresponding to one problem indicated by a problem sentence in a set of sentences including the problem sentence, the extraction unit 12 may extract the set of sentences.

With such a configuration, the question group extraction device can also present a candidate for an action for each problem to the user together with the question group.

Although the present invention has been described with reference to exemplary embodiments and examples, the present invention is not limited to the above exemplary embodiments and examples. Various modifications that can be understood by those skilled in the art can be made within the scope of the present invention with respect to a configuration or a detail of the present invention.

Also, although description as the following supplementary notes is possible, a part or whole of the above exemplary embodiments is not limited thereto.

(Supplementary note 1) A question group extraction method including: with regard to data indicating a conversation history including one or more sets of sentences formed from a problem sentence being a sentence indicating one problem, a question sentence being a sentence indicating a question for the one problem, and an answer sentence being a sentence indicating an answer to the question, adding a label indicating a problem state to the problem sentence within the data, a label indicating a question state to the question sentence within the data, and a label indicating an answer state to the answer sentence within the data; and extracting, from the data, a set of sentences with which the states indicated by the labels have been associated according to a state transition model that is a model configured from the one problem state, question state, and answer state, and that represents a transition of the states.

(Supplementary note 2) The question group extraction method according to supplementary note 1, wherein the sets of sentences are extracted from the data indicating the conversation history as many as the number of the sets of sentences included in the conversation history.

(Supplementary note 3) The question group extraction method according to supplementary note 1 or 2, wherein the labels added to the sentences within the data indicating the conversation history are corrected by utilization of the state transition model, and the sets of sentences are extracted from the data in which the labels are corrected.

(Supplementary note 4) The question group extraction method according to supplementary note 3, wherein the labels are corrected on the basis of a generation probability that is a probability that a morpheme included in a sentence is generated from an arbitrary state in the state transition model.

(Supplementary note 5) The question group extraction method according to supplementary note 4, wherein a degree of correspondence of the morpheme included in the sentence to the arbitrary state in the state transition model is learned, and the generation probability is computed by utilization of the learned degree.

(Supplementary note 6) The question group extraction method according to supplementary note 4 or 5, wherein the generation probability is computed by utilization of a distance, in the conversation history, between a sentence including the morpheme the generation probability of which is computed and a sentence to which a label indicating a state before a transition in the state transition model to a state indicated by a label added to the sentence is added.

(Supplementary note 7) The question group extraction method according to any one of supplementary notes 1 to 6, wherein a plurality of sets of sentences including problem sentences indicating the same problem is grouped and output.

(Supplementary note 8) The question group extraction method according to any one of supplementary notes 1 to 7, wherein the state transition model includes a conclusion state, a label indicating the conclusion state is added to a conclusion sentence being a sentence indicating a conclusion for one problem indicated by a problem sentence within the data indicating the conversation history, and a set of sentences including the conclusion sentence is extracted.

(Supplementary note 9) The question group extraction method according to any one of supplementary notes 1 to 8, wherein a sentence indicating action contents corresponding to one problem indicated by a problem sentence is included in a set of sentences including the problem sentence, and the set of sentences is extracted.

(Supplementary note 10) A question group extraction device including: an addition unit which, with regard to data indicating a conversation history including one or more sets of sentences formed from a problem sentence being a sentence indicating one problem, a question sentence being a sentence indicating a question for the one problem, and an answer sentence being a sentence indicating an answer to the question, adds a label indicating a problem state to the problem sentence within the data, a label indicating a question state to the question sentence within the data, and a label indicating an answer state to the answer sentence within the data; and an extraction unit which extracts, from the data, a set of sentences with which the states indicated by the labels have been associated according to a state transition model that is a model configured from the one problem state, question state, and answer state, and that represents a transition of the states.

(Supplementary note 11) A non-transitory computer-readable recording medium that records a question group extraction program that with regard to data indicating a conversation history including one or more sets of sentences formed from a problem sentence being a sentence indicating one problem, a question sentence being a sentence indicating a question for the one problem, and an answer sentence being a sentence indicating an answer to the question, adds a label indicating a problem state to the problem sentence within the data, a label indicating a question state to the question sentence within the data, and a label indicating an answer state to the answer sentence within the data, and extracts, from the data, a set of sentences with which the states indicated by the labels have been associated according to a state transition model that is a model configured from the one problem state, question state, and answer state, and that represents a transition of the states when being executed by a computer.

REFERENCE SIGNS LIST

10, 100 Question group extraction device
11 Addition unit
12 Extraction unit
101 CPU
102 Main storage unit
103 Communication unit
104 Auxiliary storage unit
105 Input unit
106 Output unit
107 System bus
111 Learning reception unit
112 Learning label addition unit
113 Alignment generation unit
114 Output probability computation unit
121 Extraction reception unit
122 Extraction label addition unit
123 State transition model reference unit
124 Generation probability computation unit
125 Output unit

The invention claimed is:

1. A computer-implemented question group extraction method comprising:
adding labels to data, the data indicating a conversation history including one or more sets of sentences formed from a problem sentence being a sentence indicating a problem, a question sentence being a sentence indicating a question for the problem, and an answer sentence being a sentence indicating an answer to the question, labels indicating a problem state to the problem sentence within the data, a question state to the question sentence within the data, and an answer state to the answer sentence within the data, the data indicating a problem state to the problem sentence within the data, a question state to the question sentence within the data, and an answer state to the answer sentence within the data; and
extracting, from the data, a set of sentences with which the states indicated by the labels are associated according to a state transition model that is a model configured from the one problem state, question state, and answer state, and that represents a transition of the states.

2. The computer-implemented question group extraction method according to claim 1, wherein
the sets of sentences are extracted from the data indicating the conversation history as many as the number of the sets of sentences included in the conversation history.

3. The computer-implemented question group extraction method according to claim 1, wherein the labels added to the sentences within the data indicating the conversation history are corrected by utilization of the state transition model, and the sets of sentences are extracted from the data in which the labels are corrected.

4. The computer-implemented question group extraction method according to claim 3, wherein the labels are corrected on the basis of a generation probability that is a probability that a morpheme included in a sentence is generated from an arbitrary state in the state transition model.

5. The computer-implemented question group extraction method according to claim 4, wherein a degree of correspondence of the morpheme included in the sentence to the arbitrary state in the state transition model is learned, and the generation probability is computed by utilization of the learned degree.

6. The computer-implemented question group extraction method according to claim 4, wherein the generation probability is computed by utilization of a distance, in the conversation history, between a sentence including the morpheme the generation probability of which is computed and a sentence to which a label indicating a state before a transition in the state transition model to a state indicated by a label added to the sentence is added.

7. The computer-implemented question group extraction method according to claim 1, wherein a plurality of sets of sentences including problem sentences indicating the same problem is grouped and output.

8. The computer-implemented question group extraction method according to claim 1, wherein the state transition model includes a conclusion state, a label indicating the conclusion state is added to a conclusion sentence being a sentence indicating a conclusion for the problem indicated by the problem sentence within the data indicating the conversation history, and a set of sentences including the conclusion sentence is extracted.

9. The computer-implemented question group extraction method according to claim 1, wherein a sentence indicating action contents corresponding to the problem indicated by the problem sentence is included in a set of sentences including the problem sentence, and the set of sentences is extracted.

10. A question group extraction device comprising:

an addition unit, implemented by a hardware including one or more processors, which, add labels to data, the data indicating a conversation history including one or more sets of sentences formed from a problem sentence being a sentence indicating a problem, a question sentence being a sentence indicating a question for the problem, and an answer sentence being a sentence indicating an answer to the question, labels indicating a problem state to the problem sentence within the data, a question state to the question sentence within the data, and an answer state to the answer sentence within the data, the data indicating a problem state to the problem sentence within the data, a question state to the question sentence within the data, and an answer state to the answer sentence within the data; and an extraction unit, implemented by the hardware, which extracts, from the data, a set of sentences with which the states indicated by the labels are associated according to a state transition model that is a model configured from the one problem state, question state, and answer state, and that represents a transition of the states.

11. A non-transitory computer-readable recording medium that records a question group extraction program that adds labels to data, the data indicating a conversation history including one or more sets of sentences formed from a problem sentence being a sentence indicating a problem, a question sentence being a sentence indicating a question for the problem, and an answer sentence being a sentence indicating an answer to the question, labels indicating a problem state to the problem sentence within the data, a question state to the question sentence within the data, and an answer state to the answer sentence within the data, the data indicating a problem state to the problem sentence within the data, a question state to the question sentence within the data, and an answer state to the answer sentence within the data, and extracts, from the data, a set of sentences with which the states indicated by the labels are associated according to a state transition model that is a model configured from the one problem state, question state, and answer state, and that represents a transition of the states when being executed by a computer.

12. The computer-implemented question group extraction method according to claim 2, wherein the labels added to the sentences within the data indicating the conversation history are corrected by utilization of the state transition model, and the sets of sentences are extracted from the data in which the labels are corrected.

13. The computer-implemented question group extraction method according to claim 12, wherein the labels are corrected on the basis of a generation probability that is a probability that a morpheme included in a sentence is generated from an arbitrary state in the state transition model.

14. The computer-implemented question group extraction method according to claim 13, wherein a degree of correspondence of the morpheme included in the sentence to the arbitrary state in the state transition model is learned, and the generation probability is computed by utilization of the learned degree.

15. The computer-implemented question group extraction method according to claim 5, wherein the generation probability is computed by utilization of a distance, in the conversation history, between a sentence including the morpheme the generation probability of which is computed and a sentence to which a label indicating a state before a transition in the state transition model to a state indicated by a label added to the sentence is added.

16. The computer-implemented question group extraction method according to claim 13, wherein the generation probability is computed by utilization of a distance, in the conversation history, between a sentence including the morpheme the generation probability of which is computed and a sentence to which a label indicating a state before a transition in the state transition model to a state indicated by a label added to the sentence is added.

17. The computer-implemented question group extraction method according to claim 14, wherein the generation probability is computed by utilization of a distance, in the conversation history, between a sentence including the morpheme the generation probability of which is computed and a sentence to which a label indicating a state before a transition in the state transition model to a state indicated by a label added to the sentence is added.

18. The computer-implemented question group extraction method according to claim 2, wherein
a plurality of sets of sentences including problem sentences indicating the same problem is grouped and output.

19. The computer-implemented question group extraction method according to claim 3, wherein
a plurality of sets of sentences including problem sentences indicating the same problem is grouped and output.

20. The computer-implemented question group extraction method according to claim 4, wherein
a plurality of sets of sentences including problem sentences indicating the same problem is grouped and output.

\* \* \* \* \*